INVENTOR'S
DUANE W. BAXTER
DAVID W. ANIS
BY J T Comfort
ATTORNEY

United States Patent Office 3,217,304

Patented Nov. 9, 1965

3,217,304
MEMORY SYSTEM

Duane W. Baxter, Kingston, and David W. Anis, Red Hook, N.Y., assignors to International Business Machines Corporation, New York, N.Y., a corporation of New York Filed June 29, 1961, Ser. No. 120,652
7 Claims. (Cl. 340—174.1)

Figure 1:
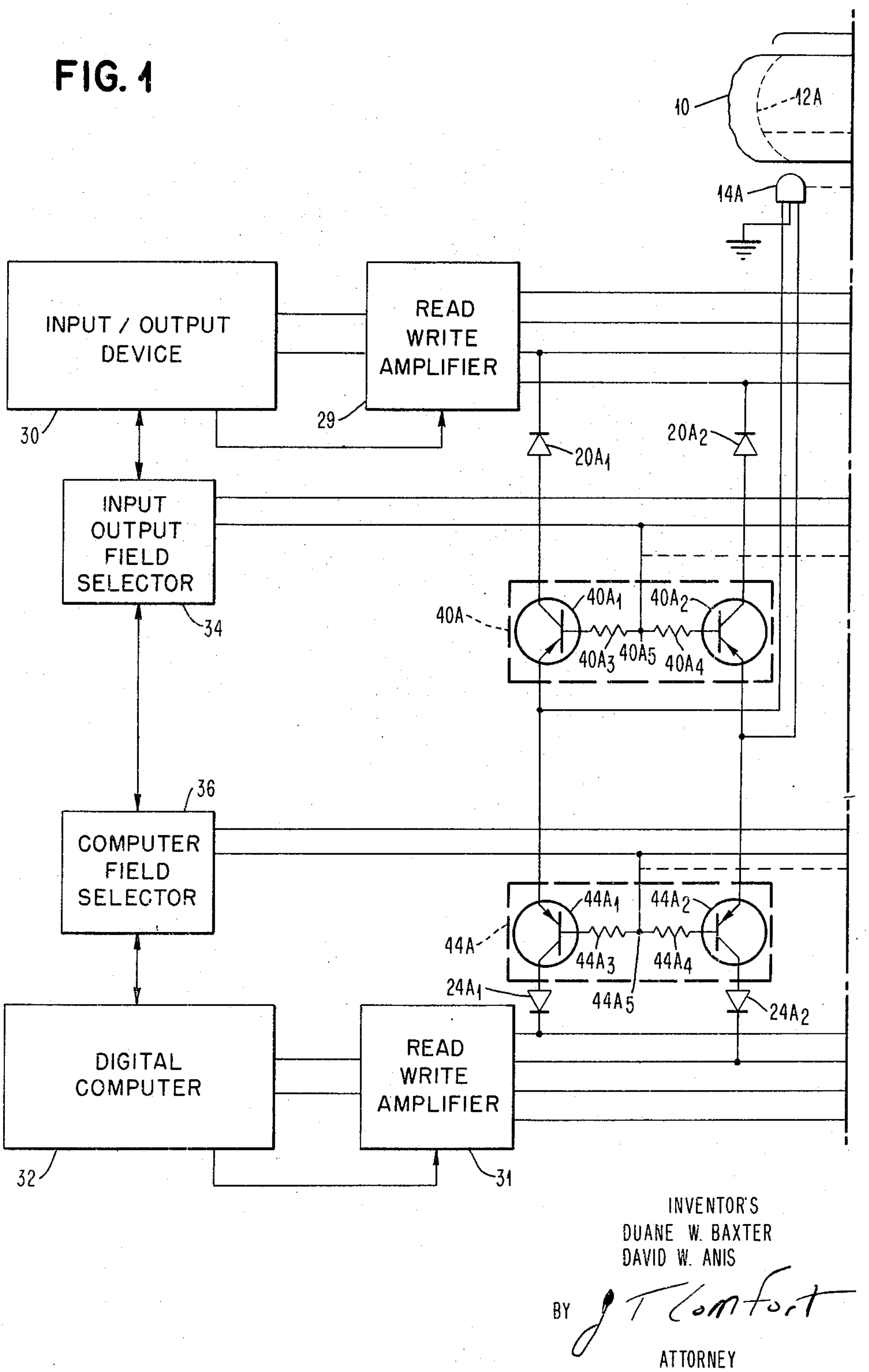
Figure 1A:
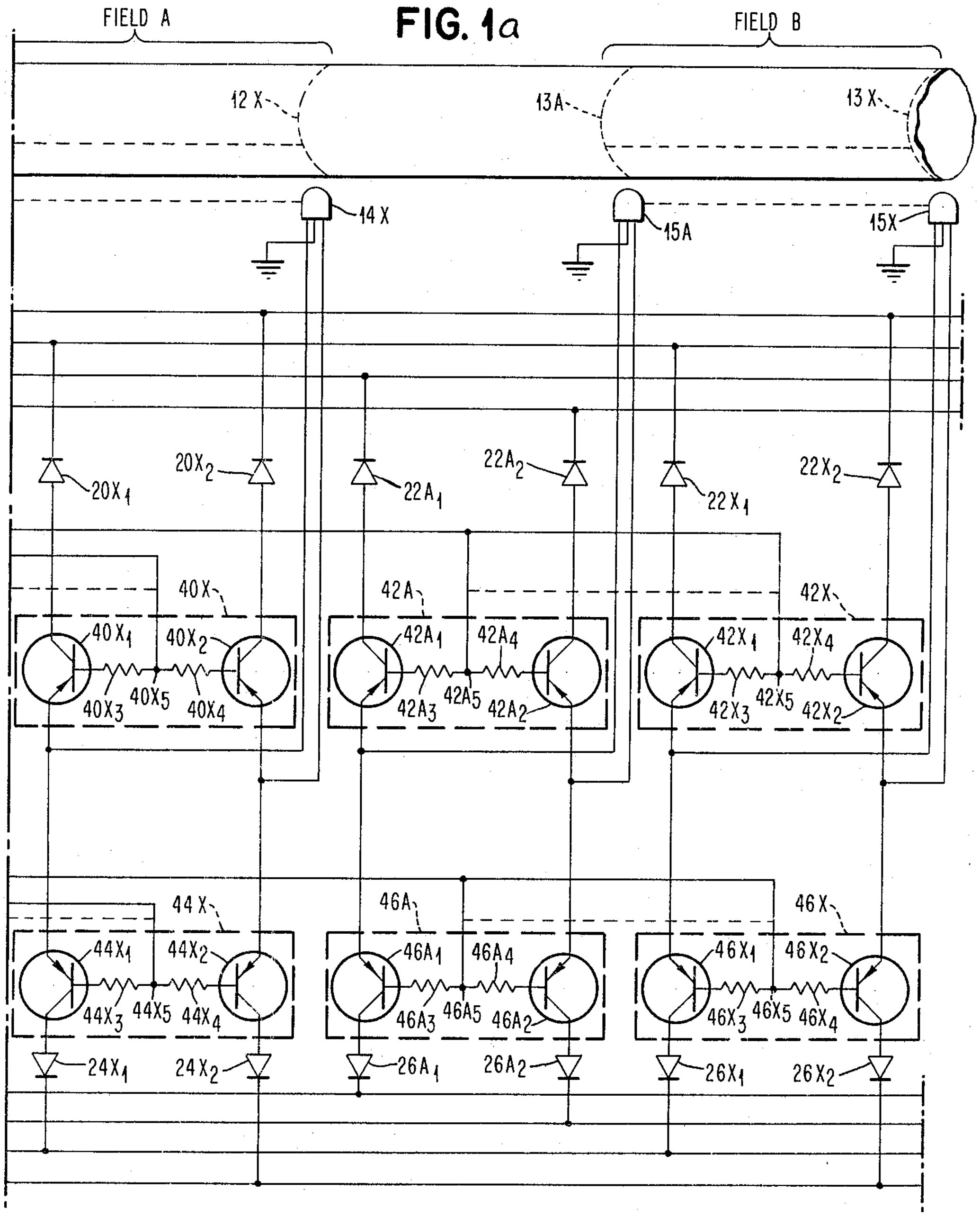

This invention relates to a memory system, and more particularly to a memory system shared by two data handling devices.

Memory devices are often used as buffer storage devices to temporarily store data being transferred between two data handling devices such as an input/output device and a digital computer. Examples of such buffer storage devices are magnetic transducing devices such as drums or discs and the description hereinafter will be directed to the preferred embodiment utilizing magnetic drums by way of illustration.

Large magnetic drums have a plurality of fields, each field consisting of a plurality of channels with each channel accommodating a series of bits of data so that each field effectively accommodates a series of words of data. At least one read/write head is assigned to each channel to transfer data to and from the magnetic drum.

It would be advantageous to use the same read/write heads for transferring data to and from the digital computer and for transferring data to and from the input/output device and to communicate between the buffer storage devices and both data handling devices simultaneously. However, cross-talk or noise cannot be tolerated on the buffer output lines due to any action by the input system. Therefore in the past when a digital computer and an input/output device have time shared the same read/write heads, it has been necessary to restrain the inputs when data is being read from the magnetic drum to avoid cross-talk or noise such that it was not possible to read and write on different channels of the drum simultaneously. Formerly it was impossible to read from a single head system simultaneously with a write operation being performed through the same switching matrix, thereby effectively lowering the value of the magnetic drum as a buffer storage device. It has heretofore been standard practice in the art to use two read/write heads for each channel, one read/write head being assigned to each data handling device. In this manner, the input/output device and the computer may use the magnetic drum at the same time with random inputs and outputs. However, the duplication of read/write heads for a single data channel is expensive and magnetic drum read/write heads are extremely difficult to install and maintain.

Accordingly, it is among the objects of this invention to provide:

A new and improved memory system for transferring data to and from a memory device;

A new and improved memory system shared by two data handling devices;

A new and improved memory system for buffering data between two data handling devices; and A new and improved magnetic drum system for buffering data between a digital computer and an input/output device.

In accordance with the principles of this invention a buffer storage device is shared by a first and second data handling device. A switching matrix comprising a plurality of first gating means associated with the first data handling device and a plurality of second gating means associated with the second data handling device is employed. Corresponding ones of the first and second gating means are associated with each read/write head. First conditioning means applies signals to selectively condition the first gating means. Second conditioning means applies signals to selectively condition the second gating means. The first gating means are responsive to the conditioning signals from the first conditioning means to provide a transfer path between the serial memory device and the first data handling device for the transfer of data therebetween, and the second gating means are responsive to the conditioning signals from the second conditioning means to provide a transfer path between the serial memory device and the second data handling device for the transfer of data therebetween. The present invention permits simultaneous two way communication between the buffer and data handling devices.

The foregoing and other objects, features and advantages of the invention will be apparent from the following more particular description of a preferred embodiment of the invention, as illustrated in the accompanying drawing.

FIG. 1 is a schematic block diagram of a magnetic drum system embodying the invention.

Referring now to FIG. 1, two fields A and B of magnetic drum 10 are shown, each field having data channels 12A–12X and 13A–13X. The additional fields, data channels and associated circuitry are identical to those shown and hereinafter described and are represented by dashed lines. Each data channel accommodates one information bit at a time and each field accommodates a data word composed of a plurality of data bits. Data transferred to or from the drum is normally transferred in parallel one word at a time.

Read/write heads 14A–14X and 15A–15X are provided for each data channel for transferring data to and from the magnetic drum 10. The switching matrix between the data handling devices and drum comprises sets of gating circuitry and associated diodes. The center tap of each read/write head is grounded. Each read/write head is connected to two gates; head 14A to gates 40A and 44A, head 14X to gates 40X and 44X, head 15A to gates 42A and 46A, and head 15X to gates 42X and 46X. Input/output selection gates 40A–40X and 42A–42X are connected through diodes 20A–20X and 22A–22X as shown and through read/write amplifiers 29, to an input/output device 30. Computer selection gates 44A–44X and 46A–46X are connected through diodes 24A–24X and 26A–26X as shown and through read/write amplifier 31 to a digital computer 32. The input/output field selector 34 selects the field of drum 10 which is to be involved in the transfer of data between the drum 10 and the input/output device 30 and the computer field selector 36 selects the field which is to be involved in the transfer of data between the drum 10 and the digital computer 32. The input/output field selector 34 and the computer field selector 36 check with each other before selecting a field for transfer of data to determine if that field has already been selected. For random input/output operation the input/output device is given priority over the computer.

Gates 40A–40X, 42A–42X, 44A–44X and 46A–46X within the dotted lines are identical in design and operation. For illustrative purposes gate 40A will be described in detail. Two PNP transistors $40A_1$ and $40A_2$ have their bases connected to a common point $40A_5$ through equal resistors $40A_3$ and $40A_4$ respectively. An input D.C. level is applied to the common point $40A_5$ from the input/output filled selector 34. When the input level to the common point $40A_5$ is positive the base to emitter junctions of transistors $40A_1$ and $40A_2$ are reverse biased cutting off both transistors $40A_1$ and $40A_2$. When cut off, the impedance of the transistors is very high. When the input level is negative the base to emitter junctions are forward biased, turning on transistors $40A_1$ and $40A_2$. The impedance of the transistors when turned on is very low.

The emitters of both transistors $40A_1$ and $40A_2$ are connected to read/write head 14A and the collectors of transistors $40A_1$ and $40A_2$ to the input/output device 30 through diodes $20A_1$ and $20A_2$ and the read/write amplifiers 29.

The operation of the drum system will be described now with a description of a transfer of data between the drum 10 and the computer 32 and a transfer of data between the drum 10 and the input/output device 30.

Initially assume that no transfer of data is being performed between the drum 10, the input/output device 30, and the computer 32. Assume also the computer field selector 36 and the input/output field selector 34 apply a positive D.C. level to all of the gates 40A–40X, 42A–42X, 44A–44X and 46A–46X, reverse biasing the base to emitter junctions of the transistors, and cutting off all of the transistors in the gates. All of the gates are thus deconditioned as the impedance across all of the transistors in the gates is very high preventing any data transfer through the gates.

Next assume that a transfer of data is to be effected between the computer 32 and field A of drum 10. The computer 32 signals the computer field selector 36 that a transfer of data is to take place between the computer 32 and field A of the magnetic drum 10. Before any field is selected the computer field selector 36 checks with the input/output field selector 34 to make sure that field A has not already been selected. As field A has not been selected the computer field selector 36 applies a negative D.C. level to the common points $44A_5$ and $44X_5$ of gates 44A and 44X to forward bias the emitter base junction of transistors $44A_1$, $44A_2$, $44X_1$ and $44X_2$, turning these transistors on. The gates 44A and 44X are thus conditioned and the impedance across the transistors $44A_1$, $44A_2$, $44X_1$ and $44X_2$ is almost zero. This is a select condition with the gates 44A and 44X permitting a data transfer between field A of magnetic drum 10 and the computer 32.

Assume that at the same time a transfer is being effected between field A of the drum 10 and the computer 32 it is desirable to have field B of the magnetic drum 10 available for random input/output operation. Assume that the input/output device 30 signals the input/output field selector 34 that field B of the magnetic drum 10 is to be available for random input/output transfers. Before the input/output field selector 34 selects a field it checks the computer field selector 36 to determine if field B has already been selected by the computer field selector 36. If the input/output transfer of data is to have priority and the computer field selector 36 had selected field B of drum 10, the input/output field selector 34 would command the computer field selector 36 to deselect field B and decondition gates 46A and 46X. However, as field B had not been selected by the computer field selector 36, the input/output field selector 34 delivers a negative D.C. level to common points $42A_5$ and $42X_5$ of gates 42A and 42X to forward bias the emitter base junctions of transistors $42A_1$, $42A_2$, $42X_1$ and $42X_2$ turning these transistors on. The impedance across these turned on transistors $42A_1$, $42A_2$, $42X_1$ and $42X_2$ is almost zero and gates 42A and 42X are thus conditioned. Field B of drum 10 is thus selected permitting data transfer between field B and the input/output device 30.

After the fields have been selected the transfer operations are performed in a normal manner. The computer 32 and the input/output device 30 determine if a read or write operation is to take place and select either the read or write amplifiers (not shown) in read/write amplifiers 29 and 31.

On a read operation the signals induced in the windings of the selected read/write heads pass through the turned on transistors, through the forward biased diodes, to the read amplifiers (not shown) in the read/write amplifiers 29 or 31, and to the input/output device 30 or the computer 32.

On a write operation the write amplifiers (not shown) deliver a negative signal on one of two lines from the read/write amplifiers 29 or 31. The signal is delivered on different lines depending on the direction the magnetic surface is to be magnetized. A circuit is completed from the applied negative potential from the write amplifiers through two forward biased diodes, through two turned on transistors, through the read/write heads, to ground. The induced magnetic field magnetically records on the magnetic surface of the drum 10. In this manner the data is written on the drum 10.

When a negative current on one line passes through the read/write head during a write operation, an equal and opposite signal is induced on the other line. If no diodes were placed between the transistors and the read/write amplifiers, the induced positive signal would tend to affect the base to collector junction of the cutoff transistors associated with the unselected field and connected to the same data line. The application of the positive signal to the cutoff transistors would draw a small current through the transistor. If the other data handling device were reading from the other field, the small current through the cutoff transistor would affect the read amplifiers. With the diodes insered in the lines between the transistors and read/write amplifiers, the induced positive signal applied to the diode back biases the diode and no current passes. Thus, the diodes act as current limiters.

The action of the diodes as current limiters may be understood by the following example. Assume that data is being transferred from the input/output device 30 to field B of drum 10. Gates 40A and 40X are deconditioned with the transistors $40A_1$, $40A_2$, $40X_1$ and $40X_2$ cutoff and gates 42A and 42X are conditioned with transistors $42A_1$, $42A_2$, $42X_1$ and $42X_2$ turned on. Assume also that data is being transferred from field A of drum 10 to digital computer 32 at the same time. Gates 44A and 44X are conditioned wtih transistors $44A_1$, $44A_2$, $44X_1$ and $44X_2$ turned on and gates 46A and 46X are deconditioned with transistors $46A_1$, $46A_2$, $46X_1$ and $46X_2$ cutoff during such a transfer.

Assume that a negative signal from the write amplifiers (in read/write amplifiers 29) is applied on the two lines connected to diodes $22A_2$ and $22X_2$. A circuit is completed through the forward biased diodes $22A_2$ and $22X_2$, through the turned on transistors $42A_2$ and $42X_2$, through the read/write heads 15A and 15X, to ground. The induced magnetic field magnetically records on the magnetic surface of the drum 10. An equal and opposite positive signal is induced in the lines connecting the read/write heads 15A and 15X and turned on transistors $42A_1$ and $42X_1$. The induced positive signal passes through forward biased diodes $22A_1$ and $22X_1$ to the lines connecting diodes $22A_1$ and $22X_1$ with read/write amplifiers 29. Cutoff transistors $40A_1$ and $40X_1$ are also connected through diodes $20A_1$ and $20X_1$ to the same lines. If diodes $20A_1$ and $20X_1$ were not present the induced positive signal would disturb the base to collector junction in cutoff transistors $40A_1$ and $40X_1$ and pull current through transistors $40A_1$ and $40X_1$. As it has been assumed that data is being read from field A of drum 10 to computer 32 during the same time data is being written in field B of drum 10, gates 44A and 44X are conditioned and transistors $44A_1$ and $44X_1$ are turned on. The current pulled through transistors $40A_1$ and $40X_1$ would be sufficient to be seen across the read amplifiers (in read/write amplifiers 31) associated with digital computer 32.

With diodes $20A_1$ and $20X_1$ inserted between cutoff transistors $40A_1$ and $40X_1$ the induced positive signal from heads 15A and 15X back biases diodes $20A_1$ and $20X_1$ as transistors $40A_1$ and $40X_1$ are cut off. Thus, no current is drawn through the cutoff transistors $40A_1$ and $40X_1$ and the read amplifiers in read/write amplifiers 31 are not disturbed.

As stated before when the transistors in the gates 40A–40X, 42A–42X, 44A–44X and 46A–46X are cut off the impedance across the transistors is large. The gates are thus deselected with the gates inhibiting the reading or writing of data to or from the drums through the deselected field gates.

When data is being transferred between the computer 32 and field A of the drum 10, and between input/output device 30 and field B of drum 10, gates 42A, 42X, 44A and 44X are conditioned and gates 40A, 40X, 46A and 46X are deconditioned.

The high impedance of the cutoff transistors $40A_1$, $40A_2$, $40X_1$ and $40X_2$ in gates 40A and 40X and back biased diodes $20A_1$, $20A_2$, $20X_1$ and $20X_2$ prevents any significant write noise (when writing on field B of drum 10 from input/output device 30) from being transferred to the read/write heads 14A and 14X associated with field A of drum 10, or to the read amplifiers in read/write amplifiers 31. The high impedance of the cutoff transistors $46A_1$, $46A_2$, $46X_1$ and $46X_2$ in gates 46A and 46X and back biased diodes $26A_1$, $26A_2$, $26X_1$ and $26X_2$ prevents any significant write noise (when writing on field A of drum 10 from the computer 32) from being transferred to heads 15A and 15X associated with field B of drum 10 or to the read/write amplifiers 29.

Conversely, during any read operation from field A of drum 10 to the computer 32 or from field B of the drum 10 to input/output device 30 the high impedance of the cutoff transistors $40A_1$, $40A_2$, $40X_1$, $40X_2$ $46A_1$, $46A_2$, $46X_1$ and $46X_2$ in the deconditioned gates 40A, 40X, 46A and 46X prevents any read signal feed through from the deselected fields.

In summary, a memory system and in particular a magnetic drum system for simultaneously servicing a plurality of data handling devices has been described. The magnetic drum has more than one field and it has been shown how a computer and an input/output device share the same set of drum read/write heads and how normal computer read/write operation and normal input/output read/write operation can occur at the same time, with only the limitation being that the same field cannot be selected for both at the same time. Thus, the drum may effectively and economically be used as a buffer with random inputs and outputs at the same time the computer proceeds with normal read/write operations.

While the invention has been particularly shown and described with reference to a preferred embodiment thereof, it will be understood by those skilled in the art that various changes in form and detail may be made therein without departing from the spirit and scope of the invention.

What is claimed is:

1. A memory device for simultaneously servicing first and second data handling devices comprising in combination
   a magnetic storage medium having a plurality of data channels,
   a plurality of transducers magnetically coupled to said data channels for transferring data to and from said data channels,
   first and second data handling devices,
   a switching matrix interconnected between said storage medium and said data handling devices,
   said switching matrix comprising a plurality of first and second gating means, said gating means being connected to said first and second data handling devices, each of said transducers being coupled to an associated one of said first and second gating means,
   and means for selectively conditioning said first or second gating means,
   said gating means being responsive to said selective conditioning means to provide bi-directional transfer paths between said memory device and said data handling devices for the transfer of data therebetween.

2. A memory device shared by a first and second data handling device, said memory device having a first and second field, each field having a plurality of parallel data channels for storing data, comprising,
   a transducer magnetically coupled to each of said data channels for transferring data to and from the data channels of said first and second fields,
   a switching matrix interconnected between said fields of said memory devices and said data handling devices, said switching matrix including first and second gating means connected to said first data handling device,
   third and fourth gating means connected to said second data handling device,
   means coupling first and third gating means with the transducer associated with said first field,
   means coupling said second and fourth gating means with the transducers associated with said second field,
   first conditioning means for applying signals to selectively condition said first and second gating means,
   second conditioning means for applying signals to selectively condition said third and fourth gating means,
   said gating means being responsive to the conditioning signals from said conditioning means to selectively provide transfer paths between the fields of said memory device and said data handling devices for the transfer of data therebetween.

3. A memory device shared by a first and second data handling device, said memory device having a plurality of parallel data channels for storing data, comprising,
   a read/write head associated with each of said data channels for writing and reading data on and from said data channels respectively,
   a plurality of first gate circuits each having a first, second and third terminal,
   a plurality of second gate circuits each having a first, second and third terminal,
   each of said read/write heads being coupled between the first terminals of associated first and second gate circuits,
   means coupling the second terminals of said corresponding ones of said first and second gate circuits to said first and second data handling devices respectively,
   a plurality of third gate circuits each having a first, second and third terminal,
   a plurality of fourth gate circuits each having a first, second and third terminal,
   each of said read/write heads being coupled between the first terminals of associated third and fourth gate circuits, means coupling the second terminals of said third and fourth gate circuits to said first and second data handling devices respectively,
   first conditioning means for applying signals to the third terminals of said corresponding ones of said first and third gate circuits to selectively condition said corresponding ones of said first and third gate circuits to provide transfer paths between said memory device and said first data handling device,
   and second conditioning means for applying signals to the third terminals of said corresponding ones of said second and fourth gate circuits to selectively condition said corresponding ones of said second and fourth gate circuits to provide transfer paths between said memory device and said second data handling device.

4. A memory device shared by a first and second data handling device, said memory device having first and second fields, each field having a plurality of parallel data channels for storing data, comprising,
   a read/write head inductively coupled to each of said data channels for transferring data to and from said data channels of said first and second fields, a switching matrix interconnected between said memory device and said first and second data handling devices, said switching matrix including a plurality of first transistor circuits each having a first, second and third terminal, a plurality of second transistor circuits each having a first, second and third terminal, means coupling each of said read-write heads between the first terminals of corresponding ones of said first and second transistor circuits, means coupling the second terminals of said corresponding ones of said first and second transistor circuits to said first and second data handling devices respectively, a plurality of third transistor circuits each having a first, second and third terminal, a plurality of fourth transistor circuits each having a first, second and third terminal, means coupling each of said read/write heads between the first terminals of corresponding ones of said third and fourth transistor circuits, means coupling the second terminals of said corresponding ones of said third and fourth transistor circuits to said first and second data handling devices respectively, first conditioning means for applying signals to the third terminals of said corresponding ones of said first and third transistor circuits to selectively render said transistor circuits effective to provide transfer paths between said memory device and said first data handling device, and second conditioning means for applying signals to the third terminals of said corresponding ones of said second and fourth transistor circuits to selectively render said transistor circuits effective to provide transfer paths between said memory device and said second data handling device.

5. A memory device as claimed in claim 4 wherein said switching matrix includes control means between the second terminals of said gate circuits and said associated data handling devices to control the current flow through said gate circuits when the corresponding gate circuit is not selected.

6. A memory device as claimed in claim 4 wherein control means are included between the second terminals of said transistor circuits and said associated data handling devices to control the current flow through said transistor circuits when the corresponding transistor circuit is not rendered effective.

7. A memory device as claimed in claim 4 wherein diode means are included between the second terminals of said transistor circuits and said associated data handling devices to limit the current flow through said transistor circuits when the corresponding transistor circuit is not rendered effective.

References Cited by the Examiner

UNITED STATES PATENTS

| | | | |
|---|---|---|---|
| 2,700,148 | 1/55 | McGuigan et al. | 340—174.1 |
| 2,981,936 | 4/61 | Buhrendorf | 340—174.1 |

IRVING L. SRAGOW, *Primary Examiner.*